(12) United States Patent
Fan et al.

(10) Patent No.: US 9,071,814 B1
(45) Date of Patent: Jun. 30, 2015

(54) SCENE DETECTION BASED ON VIDEO ENCODING PARAMETERS

(71) Applicant: Google Inc., Mountain View, CA (US)

(72) Inventors: Zihong Fan, Mountain View, CA (US); Gavan Kwan, Mountain View, CA (US); Bosun Adeoti, San Francisco, CA (US)

(73) Assignee: Google Inc., Mountain View, CA (US)

( * ) Notice: Subject to any disclaimer, the term of this patent is extended or adjusted under 35 U.S.C. 154(b) by 22 days.

(21) Appl. No.: 13/968,062

(22) Filed: Aug. 15, 2013

(51) Int. Cl.
- *H04N 5/783* (2006.01)
- *H04N 5/93* (2006.01)
- *H04N 9/808* (2006.01)
- *H04N 19/177* (2014.01)
- *G11B 27/00* (2006.01)

(52) U.S. Cl.
CPC ....... *H04N 9/8082* (2013.01); *H04N 19/00284* (2013.01)

(58) Field of Classification Search
USPC ......... 386/278, 280, 282, 286, 239, 248, 343, 386/346, 347, 348
See application file for complete search history.

(56) References Cited

U.S. PATENT DOCUMENTS

| | | | |
|---|---|---|---|
| 6,400,890 B1 | 6/2002 | Nagasaka et al. | |
| 7,424,204 B2 * | 9/2008 | Nakamura | 386/248 |
| 7,483,618 B1 * | 1/2009 | Edwards et al. | 386/278 |
| 2003/0126604 A1 * | 7/2003 | Suh | 725/38 |
| 2003/0235249 A1 | 12/2003 | Zhao et al. | |

OTHER PUBLICATIONS

Huynh-Thu, Q., et al., "Impact of Jitter and Jerkiness on Perceived Video Quality," 6 pages.

* cited by examiner

*Primary Examiner* — Daquan Zhao
(74) *Attorney, Agent, or Firm* — Amin, Turocy & Watson, LLP

(57) ABSTRACT

Systems and methods for automatically detecting scenes in a video based on parameters employed to encode the video are presented. In one or more aspects, a system is provided that includes a scene identification component configured to analyze a video comprising a plurality of sequential frames, including a plurality of intra-frames (I-frames) and a plurality of predictive frames (P-frames), and identify N groups of adjacent frames constituting N scenes of the video based in part on respective locations of the I-frames throughout the plurality of sequential frames, where N is an integer. The system further includes a video clip generation component configured to generate one or more video clips from one or more of the N scenes of the video, respectively, using portions of frames respectively associated with the one or more scenes of the N scenes of the video.

20 Claims, 12 Drawing Sheets

SCENE DETECTION BASED ON VIDEO ENCODING PARAMETERS

TECHNICAL FIELD

This application generally relates to systems and methods for automatically detecting scenes in a video based on video encoding parameters.

BACKGROUND

The proliferation of available streaming content is increasing at exponential levels that will soon reach many millions if not billions of such viewable streaming content. Conventionally, broadcast media has been delivered by television or cable channels that typically have been associated with a relatively small number of content providers. However, with the ubiquitous nature of media creation and publishing tools, individuals are able to become prolific content creators. This has resulted in exponential growth of available streaming media content.

In order to generate information about media content, such as information that facilitates searching for the media content and receiving applications related to unique features of respective media content, the media content generally needs to be analyzed at a content level. Manual analysis of media content is highly inefficient considering the large corpus of available media content. Current automated video analysis techniques provide some relief. For example, some automated video content analysis techniques observe patterns in object movement and employ visual image recognition techniques to discern activity occurring in respective frames of a video. However, with respect to detecting points in a video where scene breaks occur, these automated video analysis techniques suffer from lack of accuracy and efficiency.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
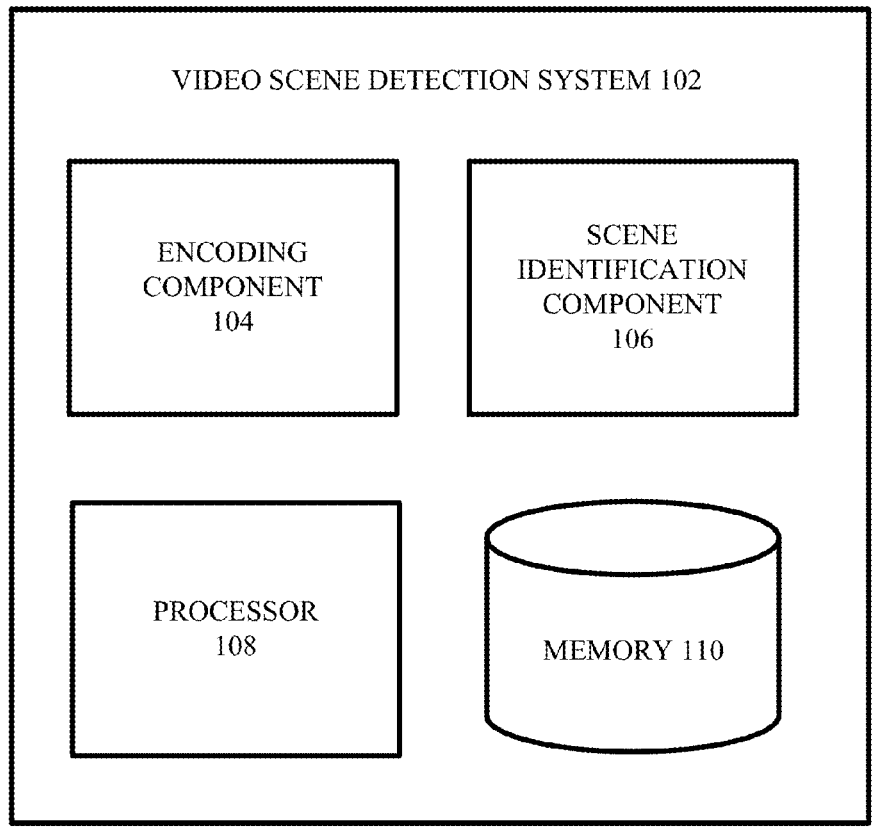
FIG. 1 presents an example system for automatically detecting scenes in a video in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods for automatically detecting scenes in a video based on parameters employed to encode the video. Automatic identification of video scenes enables a variety of mechanisms to efficiently analyze and process a video. For example, after individual scenes of a video are identified, a subset of frames associated with each of the individual scenes can be extracted to generate video clips representative of the individual scenes. The video clips can then be assembled to generate a shortened version or summary version of the video. When the different scenes of the video are identified automatically as opposed to manually, the summary video can also be generated automatically. In another example, content analysis can be performed with respect to individual scenes of a video to generate a scene by scene description of the video. The video can further be automatically classified as a function of content included in the respective scenes. Classifications and information associated with respective identified scenes of a video can also facilitate searching for specific scenes of the video. Respective scenes of a video can further be removed, replaced, or edited jointly or separately based on the content included in the respective scenes.

The subject disclosure describes a mechanism for automatically identifying different scenes in a video using parameters employed to encode/decode a video. Transmitting a video stream across a network can consume relatively high amounts of bandwidth compared to transmission of non-video data, especially when the video is recorded at high resolution, e.g., 720p or 1080p. Video streams are therefore usually compressed prior to transmission. Video compression typically employs coding techniques to reduce redundancy in video data. Most video compression algorithms and codecs combine spatial image compression and temporal motion compensation. In particular, video data may be represented as a series of still image frames. The sequence of frames contains spatial and temporal redundancy that video compression algorithms attempt to eliminate or code in a smaller size.

Similarities can be encoded by only storing differences between frames, or by using perceptual features of human vision. For example, small differences in color are more difficult to perceive than are changes in brightness. Compression algorithms can average a color across these similar areas to reduce space.

Different compression standards utilize different methods of reducing data, and hence, results differ in bit rate, quality and latency. Compression algorithms generally fall into two types: image compression and video compression. Image compression uses intra-frame coding technology; data is reduced within an image frame by removing unnecessary information that may not be noticeable to the human eye. Video compression algorithms can use inter-frame prediction to reduce video data between a series of frames. This involves techniques such as difference coding, where one frame is compared with a reference frame and only pixels that have changed with respect to the reference frame are coded.

Other techniques such as block-based motion compensation can be applied to further reduce data size. Block-based motion compensation takes into consideration that much of what makes up a new frame in a video sequence can be found in an earlier frame, but perhaps in a different location. This technique divides a frame into a series of macroblocks (blocks of pixels); block by block, a new frame can be composed or 'predicted' by looking for a matching block in a reference frame. If a match is found, the encoder codes the position where the matching block is to be found in the reference frame.

With inter-frame prediction, each frame in a sequence of images is classified as a certain type of frame, including an intra-frame (I-frame), a predictive frame inter-frame (P-frame) or a bi-predictive inter-frame (B-frame. An I-frame, also called a keyframe, is a self-contained frame that can be independently decoded without reference to other images. The first image in a video sequence is an I-frame. An I-frame is a single frame of digital content that a compressor examines independent of frames that precede and follow it and stores data needed to display that frame. Typically, I-frames are interspersed with P-frames and B-frames in a compressed video. A P-frame makes references to parts of earlier I-frames and/or P-frames to code the frame. P-frames follow I-frames and contain data that has changed from the preceding I-frame (such as color or content changes). Because of this, P-frames depend on the I-frames to fill in most of the data. A B-frame, is a frame that makes references to both an earlier reference frame and a future frame. B-frames contain data that has changed from the preceding frame or are different from the data in the very next frame.

In an aspect, the disclosed automatic scene detection techniques analyze an encoded/compressed video consisting of a plurality of I-frames interspersed with P-frames and/or B-frames. The I-frames are identified and employed as boundary frames between different scenes of the video. For example, each I-frame occurring in a video comprising a plurality of sequential frames can be considered the start of a new scene in the video. Groups of adjacent frames occurring between respective I-frames can constitute a separate scene in the video. In an aspect, video compression is tailored to facilitate encoding frames of a video as I-frames or P-frames/B-frames based on parameters that recognize spatial and temporal differences between frames associated with scene changes.

In one or more aspects, a system is provided that includes a memory having stored there on computer executable components and a processor that executes various computer executable components. The computer executable components include a scene identification component configured to analyze a video comprising a plurality of sequential frames, including a plurality of intra-frames (I-frames) and a plurality of predictive frames (P-frames), and identify N groups of adjacent frames constituting N scenes of the video based in part on respective locations of I-frames throughout the plurality of sequential frames, where N is an integer. The computer executable component further include a video clip generation component configured to generate one or more video clips from one or more of the N scenes of the video, respectively, using portions of frames respectively associated with the one or more scenes of the N scenes of the video.

In another aspect, a method is disclosed that includes using a processor to execute computer executable instructions stored in a memory to perform various acts including analyzing a video comprising a plurality of sequential frames, including a plurality of intra-frames (I-frames) and a plurality of predictive frames (P-frames). The acts further include identifying N groups of adjacent frames constituting N scenes of the video based in part on respective locations of the I-frames throughout the plurality of sequential frames, where N is an integer, and generating one or more video clips from one or more of the N scenes of the video, respectively, using portions of frames respectively associated with the one or more scenes of the N scenes of the video.

Further provided is a tangible computer-readable storage medium comprising computer-readable instructions that, in response to execution, cause a computing system to perform various operations. The operations include at least, encoding sequential frames of a video, including encoding a first subset of the frames as intra-frames (I-frames) and a second subset of the frames as predictive frames (P-frames), wherein the I-frames are interspersed amongst the P-frames. The operations further include identifying N groups of adjacent frames based in part on respective locations of the I-frames throughout the sequential frames of the video, where N is an integer, and classifying the N groups of adjacent frames as scenes of the video.

Referring now to the drawings, with reference initially to FIG. 1, presented is a diagram of an example video scene detection system 102 for automatically detecting scenes in a video, in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

Video scene detection system 102 includes encoding component 104 and scene identification component 106. Encoding component 104 is configured to encode frames of a video as I-frames, P-frames and/or B-frames using various encoding mechanisms. Scene identification component 106 is configured to identify different scenes of a video based on locations of I-frames amongst P-frames and/or B-frames of the video. Video scene detection system 102 includes memory 110 for storing computer executable components and instructions and processor 108 to facilitate operation of the instructions (e.g., computer executable components and instructions) by video scene detection system 102.

Video scene detection system 102 is configured to analyze a video to determine or infer points in the video where a scene ends and begins. In filmmaking and video production, a scene is generally thought of as the action in a single location and continuous time. However, characteristics which constitute a scene are not restricted by location. Which segments of a video constitute a scene can vary depending on interpretation of the film maker, the film editor, and the film itself. Videos often consist of one or more combined scenes. For example, a movie can have an opening scene, a closing scene, and several scenes there between, that form a storyline. Different scenes in a video are often distinguished from one another by the film maker or film editor using various mechanisms. For example, camera techniques such as fade in and fade outs can designate a scene beginning and ending respectively. Change in dialogue, change, in music, change in location, change in characters present, change in time of day, change in scenery and change in activity occurring in a video are also examples of characteristics of a video that can indicate change in scene.

Identifying starting points and ending points of different video scenes is often performed manually due to the fact that what constitutes a scene varies based on content and structure of the video. Some automated scene detection mechanisms attempt to detect scene changes by calculating camera shot locations or monitoring changes in camera motion. However, these mechanisms are not accurate. Video scene detection system 102 employs a novel mechanism to automatically identify different scenes in a video using parameters employed to encode the video. In particular, video scene detection system 102 is configured to identify starting and ending points of different scenes in a video based at least in part on locations of I-frames encoded in the video.

As noted above, I-frames include image data that serves as a reference for subsequent P-frames and/or B-frames. In essence, an I-frame is a fully specified picture that holds image information included in the P-frames and B-frames which follow the I-frame. Video scene detection system 102 employs the nature of I-frames to facilitate determining when a new scene starts and ends. For example, when a new I-frame occurs in a sequence of video frames, video scene detection system 102 can infer that the previous I-frame no longer serves as an accurate reference for the P-frames and/or B-frames which follow the new I-frame. In other words, the new I-frame and the previous I-frame include image data that is substantially different or represents substantially different pictures. Video scene detection system 102 can infer that the difference between the image data between a new I-frame and a previous I-frame is indicative of a scene change. Accordingly, video scene detection system 102 can identify segments of a video (e.g., groups of frames of the video) beginning with an I-frame and ending prior to the next I-frame, as different scenes of the video.

Encoding component 104 is configured to encode or compress a video into I-frames, P-frames and/or B-frames. In an aspect, encoding component 104 is configured to encode a plurality of sequential frames of a video into the plurality of I-frames, P-frames and/or B-frames based on spatial image compression or temporal motion compensation. For example, encoding component 104 can employ inter-frame encoding, intra-frame encoding, or a combination of inter-frame encoding and intra-frame encoding. Encoding component 104 can employ one or more existing compression standards to encode a video. For example, encoding component 104 can employ H.263, H.264, VP6, MPEG-1, MPEG-2, MPEG-3, MPEG-4.

In another aspect, encoding component 104 can employ new compression algorithms provided by video scene detection system 102 stored in memory 110. For example, encoding component 104 can employ an algorithm that is specifically tailored to account for different types of videos, such as videos having high action and/or fast moving objects, or videos having a relatively consistent landscape. In an aspect, encoding component 104 can adjust or modify an encoding algorithm employed to encode a video by adjusting factors that weight differences between image data from one frame to the next that influence whether the frame will be characterized as an I-frame, P-frame and/or B-frame. For example, encoding component 104 can employ different encoding algorithms that result in different numbers and placement of I-frames in a sequence of video frames.

Scene identification component 106 is configured to identify different scenes in a video based in part on locations of I-frames within the encoded video. For example, scene identification component 106 is configured analyze a video divided into a plurality of sequential frames wherein each of the frames are encoded as either an I-frame, a P-frame or a B-frame. Based on its analysis, scene identification component 106 can identify each of the I-frames present in the video. In an aspect, scene identification component can identify different scenes in the video by using each identified I-frame as a boundary point between scenes. For example, scene identification component 106 can determine that each identified I-frame is the start of a new scene. The P-frames and/or B-frames between the I-frames can constitute the respective scenes of the video. Accordingly, scene identification component 106 can identify sequential groups of frames in a video that include an I-frame as the first frame in the group followed by P-frames and/or B-frames.

In an aspect, scene identification component 106 is configured to identify respective scenes in a video in real time or substantially real time with respect to encoding or decoding of the video. For example, as encoding component 104 encodes respective frames of a video sequentially, the scene identification component 106 can identify which frames are encoded as I-frames, P-frame, and/or B-frames and determine scene breaks in association with each identified I-frame. According to this example, scene identification component 106 can determine different scenes of a first part of a video before a second part of the video has been encoded. In an aspect, when an encoded video is received by video scene detection system 102 as a stream of sequential data packets, scene identification component 106 can function as a decoder and sequentially decode the video as the data packets are received. In association with decoding the video, the scene identification component 106 can identify different scenes of the video in real time or substantially real time based in part on identification of the I-frames. In another aspect, scene identification component 106 can analyze an encoded video or video stream to identify I-frames, P-frames, and/or B-frames in association with determining scene boundaries without decoding the video.

In an aspect, scene identification component 106 is also configured to identify I-frames that are encoded as I-frames that do not indicate scene boundaries. For example, from an encoding standpoint, I-frames are introduced when there is less similarity in image data between frames. However this does not necessarily always indicate a scene boundary. For example, video frames that are encoded as I-frames as a result of jitter do not indicate scene boundaries. Thus in an aspect, scene identification component 106 can identify I-frames that are encoded as I-frames as a result of jitter. Scene identification component 106 can further overlook frames characterized as I-frames as a result of jitter when identifying I-frames associated with a start of a new scene. According to this aspect, scene identification component 106 can treat I-frames that are encoded as I-frames as a result of jitter as P-frames such that the I-frames that are encoded as I-frames as a result of jitter are not used as boundary points between scenes.

Jitter is a form of video compression corruption that arises when frames are repeated or dropped, either as a function of encoding errors, transmission errors, or decoding errors. The subject disclosure is specifically concerned with jitter caused by encoding errors. At the encoder side, video frames may be dropped because of a sudden increase of motion in the video content, which can cause the encoder to discard frames in order to prevent an increase of the encoding bit rate while maintaining a certain level of picture quality. This can typically occur at very low bit rates. Jitter at the encoder can also result in the characterization and encoding of a frame as an I-frame. For example, when jitter occurs at the encoder, two or more I-frames can be encoded back to back or with very few P-frames of B-frames there between.

In an aspect, scene identification component 106 is configured to identify frames encoded as I-frames as a result of jitter based in part on spacing between the I-frames. In particular, identification component can identify I-frames that are encoded as I-frames as a result of jitter based on identification of two sequential I-frames separated by less than a minimum number of P-frames. For example, identification component 104 can apply minimum spacing requirements between I-frames such that when the identification component 104 identifies an I-frame that is separated from a prior I-frame by less than a minimum number of frames (e.g., P-frames of B-frames), the later I-frame can be characterized as a frame encoded as an I-frame as a result of jitter. The identification component 104 can then overlook the jitter I-frame as a start of a new scene. For example, the identification component 104 can treat the jitter I-frame as a P-frame or B-frame.

It should be appreciated that the minimum number of P-frames or B-frames that can separate two I-frames representative of scene boundaries can include a number M, that has been predetermined by scene identification component 106. In an aspect, the minimum number of P-frames or B-frames that can separate two I-frames representative of scene boundaries is 2. In another aspect, the minimum number of P-frames or B-frames that can separate two I-frames representative of scene boundaries is 5. Still in another aspect, the minimum number of P-frames or B-frames that can separate two I-frames representative of scene boundaries is 10.

According to this aspect, multiple jitter I-frames can be clustered together. For example, scene identification component 106 can come across a sequence of frames encoded as follows: IPPPPPPPPPPPIPPIPIPPPPPPPPPIPPPPPPPP, wherein each letter I and P represents either an I-frame of a P-frame, respectively. In this sequence the I-frames are bolded to facilitate easily distinguishing them from the P-frames. This sequence includes 5 I-frames. Scene identification component 106 is configured to sequentially move through the frames to identify the frames as either an I-frame or a P-frame. For example, scene identification component 106 can identify the first I-frame and then learn that it is followed by 11 P-frames before arriving at the second I-frame. The second I-frame is followed by 2 P-frames, then a third I-frame, and then 1 P-frame followed by a fourth I-frame. The fourth I-frame is followed by 9 P-frames.

According to this example, when moving sequentially though the frames, beginning with the first I-frame in the series of frames, the identification component 104 can identify the first I-frame as an I-frame representative of a scene boundary. When arriving at the second I-frame, scene identification component 106 can identify the second I-frame as an I-frame representative of a scene boundary because it is separated from the first I-frame by over a minimum requirement of P-frames (e.g., 11 where the minimum is set to 3 for example). The scene identification component 106 can further characterize the third and fourth I-frames as frames encoded as I-frames as a result of jitter because they are separated from a prior I-frame by only 1 or 2 P-frames. Lastly, the identification component can identify the fifth I-frame as an I-frame representative of a scene boundary because it is separated from a previous I-frame by nine P-frames.

Figure 2:
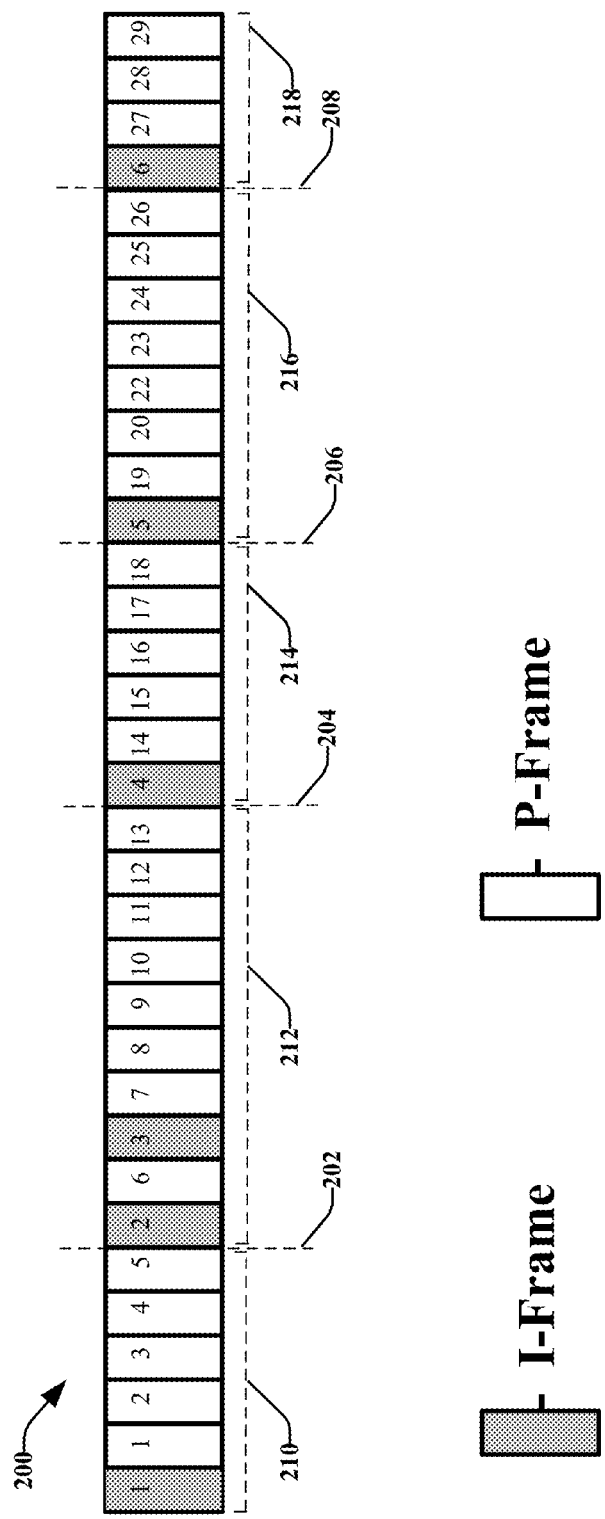
FIG. 2 presents a diagram of an example video broken up into separate scenes based in part on identification of intra-frames (I-frames) amongst predictive frames (P-frames) throughout the video in accordance with various aspects and embodiments described herein.

FIG. 2 presents a diagram of an example video 200 broken up into separate scenes by scene identification component 106 based in part on identification of I-frames amongst P-frames throughout the video, in accordance with aspects and embodiments described herein. Video 200 is depicted having 29 sequential frames labeled 1-29. It should be appreciated that video 200 is depicted having 29 frames merely for exemplary purposes. For example, scene identification component 106 is configured to identify scenes in a video having any number N frames, where N is an integer. The I-frames of video 200 are shown in grey while the P-frames are shown in white.

As seen in FIG. 2, scene identification component 106 has broken video 200 up into separate segments based in part on locations of the I-frames. In particular, dashed lines 202, 204, 206 and 208 indicate points in the video that are breaks between segments or scenes. Dashed lines 210, 212, 214, 216 and 218 indicate groups of frames that constitute a scene of the video. Each scene of video 200 begins with an I-frame followed by a plurality of P-frames. The number of P-frames included in each scene can vary.

In most aspects, each I-frame of a video will be identified by scene identification component 106 as the start of a new scene. However, in some aspects, a frame will be encoded as an I-frame as a result of jitter. Accordingly, scene identification component 106 can identify I-frames encoded as I-frames as a result of jitter. For example, segment 212 includes two I-frames, (e.g., I-frame 2 and I-frame 3). In an aspect, because I-frame 3 is separated from a prior I-frame by only a single P-frame, scene identification component 106 can determine that I-frame 3 is encoded as an I-frame as a result of jitter. Accordingly, scene identification component 106 can disregard I-frame 3 as the start of a new scene and move onto the next I-frame.

Referring back to FIG. 1, in an aspect, videos encoded and analyzed by video scene detection system 102 are associated with a media provider that provides media content (e.g., video, streaming video, images, thumbnails or other static representations of video) to client devices via a network (e.g., the Internet). For example, a networked media provider can include and/or access video scene detection system 102. The media provider can employ one or more networked computing devices to store the media content, process the media content, and deliver the media content to client devices via a network. In an aspect, media content stored and processed by the media provider is received from one or more client devices and made accessible to other client devices via the network. The media provider can include and/or access video scene detection system 102 to facilitate analyzing and processing video received by and/or stored by the media provider. In an aspect, videos received by video scene detection system include videos that have been previously encoded into I-frames, P-frames, and/or B-frames. In another aspect, encoding component 104 can encode videos received by video scene detection system 102.

In another aspect, videos encoded and analyzed by video scene detection system 102 are associated with a client device. For example, a client device can include video scene detection system 102 to analyze and process videos captured by a camera of the client device or otherwise received at the client device. A client device as described herein can include any suitable computing device associated with a user and configured to interact with video scene detection system 102, either directly or indirectly (e.g., via a networked entity employing video scene detection system 102). For example, a client device can include a desktop computer, a laptop computer, a television, a mobile phone, a tablet personal computer (PC), or a personal digital assistant PDA. As used in this disclosure, the terms "content consumer" or "user" refer to a person, entity, system, or combination thereof that employs video scene detection system 102 (or additional systems described in this disclosure) using a client device.

Figure 3:
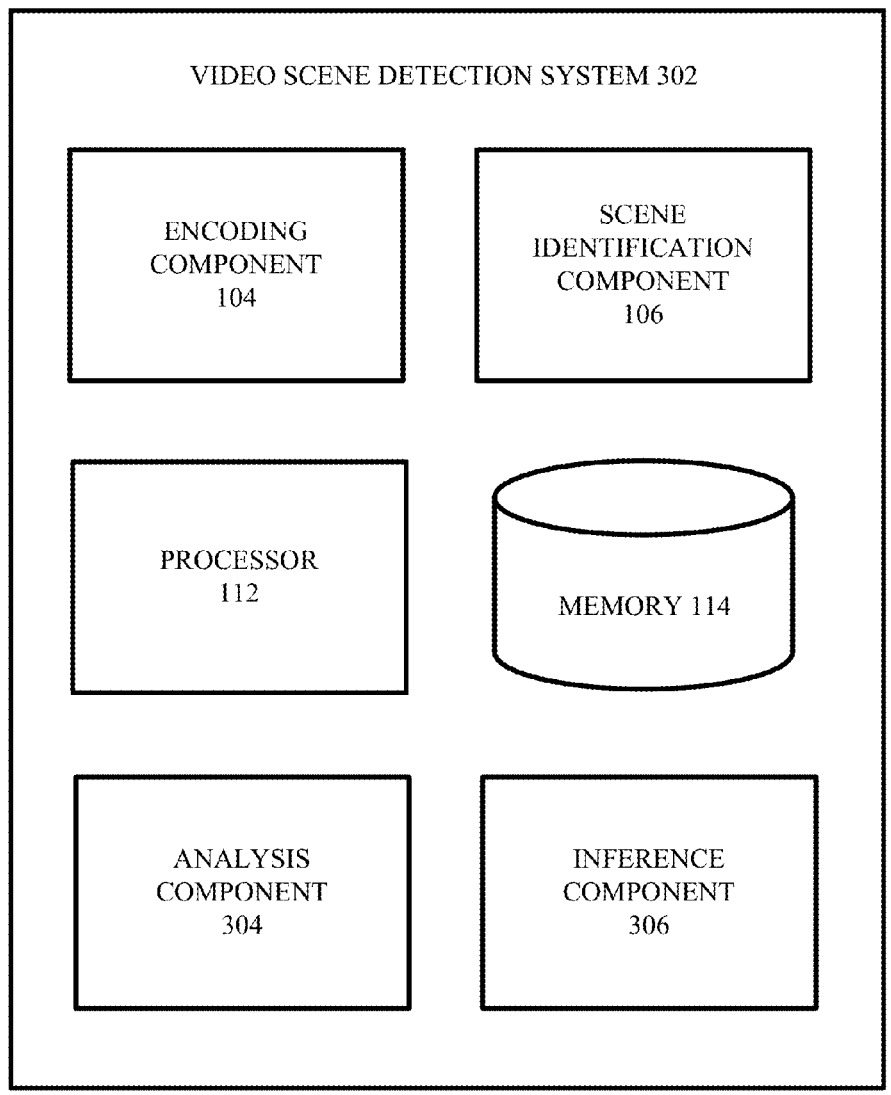
FIG. 3 presents another example system for automatically detecting scenes in a video in accordance with various aspects and embodiments described herein.

FIG. 3 presents a diagram of another an example system 302 for automatically detecting scenes in a video, in accordance with various aspects and embodiments described herein. System 302 includes same or similar features and functionalities of system 102 with the addition of analysis component 304 and inference component 306. Repetitive description of like elements employed in respective embodiments of systems described herein are omitted for sake of brevity.

Video scene detection system 302 can employ analysis component 304 and/or inference component 306 to facilitate scene identification component 106 with determining or inferring different scenes of a video based on various parameters in addition to locations of I-frames. As a result, video scene detection system 302 can enhance the accuracy in which it automatically detects scene breaks in a video.

In an aspect, analysis component 304 can set various threshold requirements for number of P-frames and/or B-frames occurring between two sequential I-frames for classification of scene breaks. For example, in some aspects, scene identification component 106 can disregard an I-frame as the start of a new scene based on identification of the I-frame as a jitter I-frame. In another aspect, even if an I-frame is not encoded as an I-frame as a result of jitter, it may be close enough to a prior I-frame such that cutting the video into a new scene based on the I-frame would result in a scene that is too short or a scene that is closely related to a prior scene.

Thus in an aspect, analysis component 304 can analyze two sequential I-frames to determine whether they should be included in a same scene based on similarity in the content of the two I-frames and/or closeness of the two I-frames. For example, analysis component can analyze image data in respective macro blocks corresponding to pixels of the two I-frames to determine a degree of similarity in the image data. Analysis component can further include the two I-frames in a same scene when the degree of similarity is above a threshold value. In another example, analysis component 304 can set a minimum requirement for scene duration, where scene duration is a function of the number of frames included in a scene. For instance, analysis component 304 can implement a rule such that each scene must include at least X frames, where X is a number. According to this aspect, where two I-frames are separated by less than X frames, the scene identification component 106 can group the two I-frames and P/B-frames which follow the respective I-frames, together as a single scene.

In another aspect, analysis component 304 can analyze features associated with content of video frames to facilitate determining scene breaks. For example, analysis component 304 can analyze changes in object movement, changes in color, changes in brightness, and/or changes in persons or objects present in frames to facilitate identifying different scenes of the video in addition to I-frame location. For instance, analysis component 304 can identify fade ins and fade outs and respectively associate them with scene beginnings and endings. In another aspect, analysis component 304 can analyze changes in camera movements to facilitate automatically identifying scene breaks.

In yet another aspect, analysis component 304 can identify changes of scene based on analysis of audio associated with the respective frames of a video. For example, analysis component 304 can identify frames in a video where music starts, stops, or changes, and employ these points as cues indicative of scene changes in association with a location of an I-frame. Similarly, analysis component 304 can identify frames of a video associated with increase in music volume or decrease in music volume. In addition, analysis component 304 can analyze dialogue occurring at certain frames in a video to determine when the tone of the dialogue changes, when new actors begin speaking, and even when the content of the dialogue changes (e.g., using voice to text analysis and/or analysis of a closed caption file associated with the video). For example, analysis component can identify a dialogue regarding chit chat about surfing and shopping to dialogue regarding panicking about a shark attack. This change in dialogue can further facilitate scene identification component 106 with identifying changes in scene in addition to a location of an I-frame occurring at or around a frame where the dialogue changes.

In another aspect, analysis component 304 can analyze metadata associated with respective frames of a video to facilitate scene identification component 106 with identification of scene breaks in addition to location of I-frames. For example, as a video is recorded, metadata can be integrated with the video that indicates a location where the video was filmed, a time when the video was filmed, actors present in the video, or other objects present in the video. According to this aspect, analysis component 304 can analyze this metadata to determine where a new scene in a video begins. For example, analysis component 304 can determine based on metadata associated with a video that at frame 66, the location of the video changed from Miami, Fla. to Denver, Colo. As a result, analysis component 304 and/or scene identification component 106 can predict with even greater accuracy that frame 66, an I-frame, is associated with the start of a new scene.

Inference component 306 is configured to provide for or aid in various inferences or determinations associated with aspects of video scene detection system 302. In an aspect, analysis component 304 and/or scene identification component 106 can employ inference component 306 to infer where scene breaks occur in a video by weighing the various cues or factors identified herein, including but not limited to: location of I-frames, spacing between consecutive I-frames, change in motion of image data between video frames, change in color of image data between video frames, change in brightness of image data between video frames, change in objects or people present in video frames, change in audio associated with respective video frames, and metadata associated with respective video frames.

In order to provide for or aid in the numerous inferences described herein, inference component 306 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, such as by $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 4:
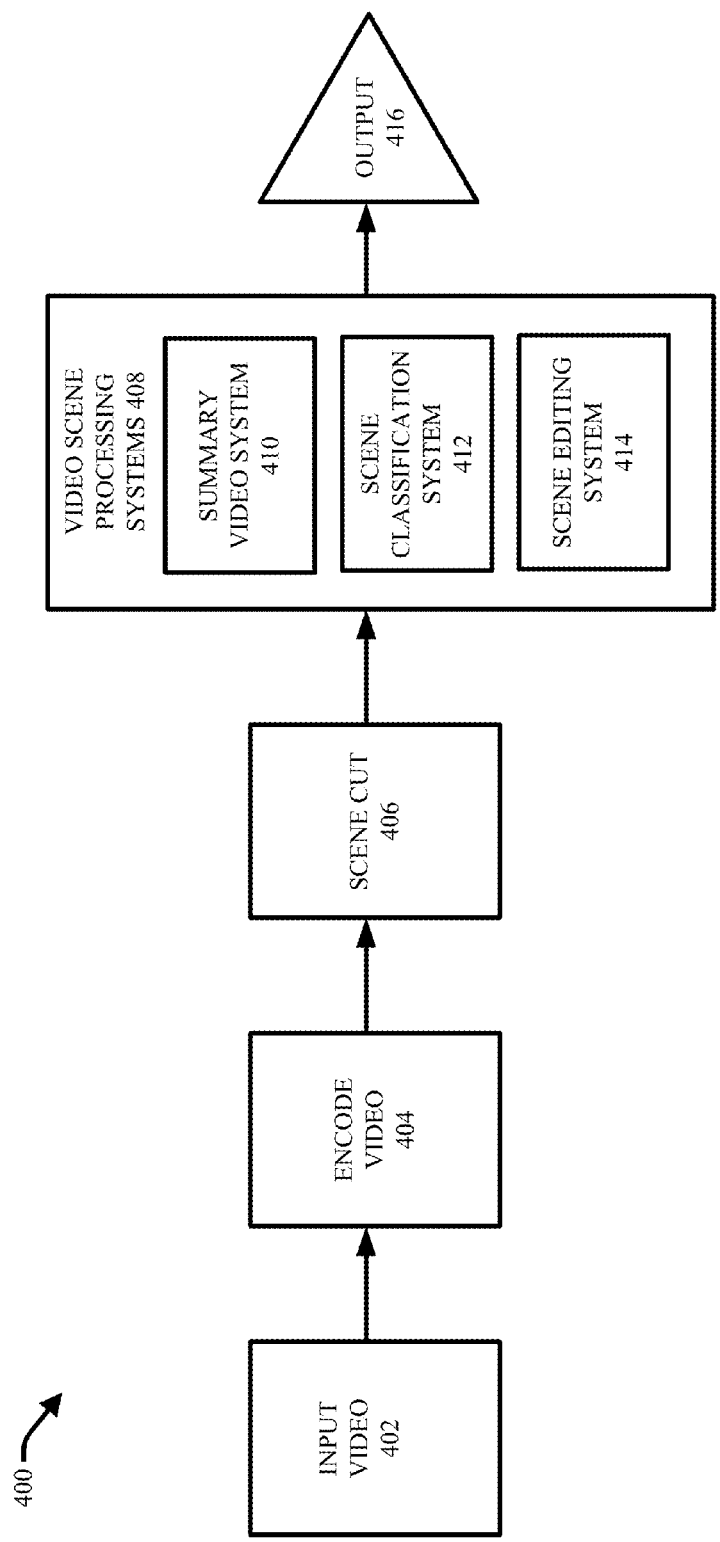
FIG. 4 presents a high level flow diagram of a method for processing a video using automatically detected scenes included in the video.

FIG. 4 presents a high level flow diagram of a method 400 for processing a video using automatically detected scenes included in the video. Repetitive description of like elements employed in respective embodiments of systems and methods described herein are omitted for sake of brevity.

The video scene detection systems described herein (e.g., system 102 and system 302) can be employed by various video processing systems to further process a video based on individual scenes of the video. For example, after different scenes of a video have been automatically identified using the disclosed video scene detection systems, a summary video system 410 can automatically generate a summary video for the video. In another example, a scene classification system 412 can automatically characterize and classify automatically identified scenes of a video with information related to the individual scenes. For instance, the scene classification system 412 can classify a scene with rating information, determine if a scene is a love scene, action scene, funny scene, etc., or determine if a particular actor or object appears in a particular scene. In another example, a scene editing system 414 can edit a video using automatically identified scenes. For instance, the scene editing system 414 can remove vulgar language from a scene or replace a scene having violent content with a scene having non-violent content.

Video processing method 400 begins with input of a video at 402. For example, the disclosed video scene detection systems (e.g., 102 and 302) can receive a video as input from a client device via a network (e.g., the Internet). In another example, the video scene detection system can retrieve a video from a database accessible to the video scene detection system. After a video is received, it can be encoded at 404 into I-frames, P-frames and/or B-frames. At 406, the video is processed by the video scene detection system and different scenes of the video are identified. For example, cuts in the video where a scene ends and a new scene begins can be identified at least in part based on locations of I-frames throughout the video. In an aspect, different scenes of the video are identified by the video scene detection system in real time or substantially real time as they are input and encoded.

In an aspect, after different scenes of the video have been identified, the video can be sent for additional processing by various video scene processing systems 408. For example, a video with its individual scenes identified can be sent to summary video system 410, scene classification system 412, and/or scene editing system 414. The output of these respective systems is then realized at 416. In one embodiment, one or more of the video scene processing systems 410, 412, and 114, are located within a same device as the video scene detection system employed to identify respective scenes in the video. In another embodiment, one or more of the video scene processing systems 410, 412, and 114, are located within a device remote from the video scene detection system. According to this embodiment, the respective devices communicate information either directly or via a network. For example, a video scene detection system located at a first device can send a video with respective scenes identified therein to a video scene processing system (e.g., system 410, 412, or 414) via a network (e.g., a cellular network, the Internet, etc.).

Figure 5:
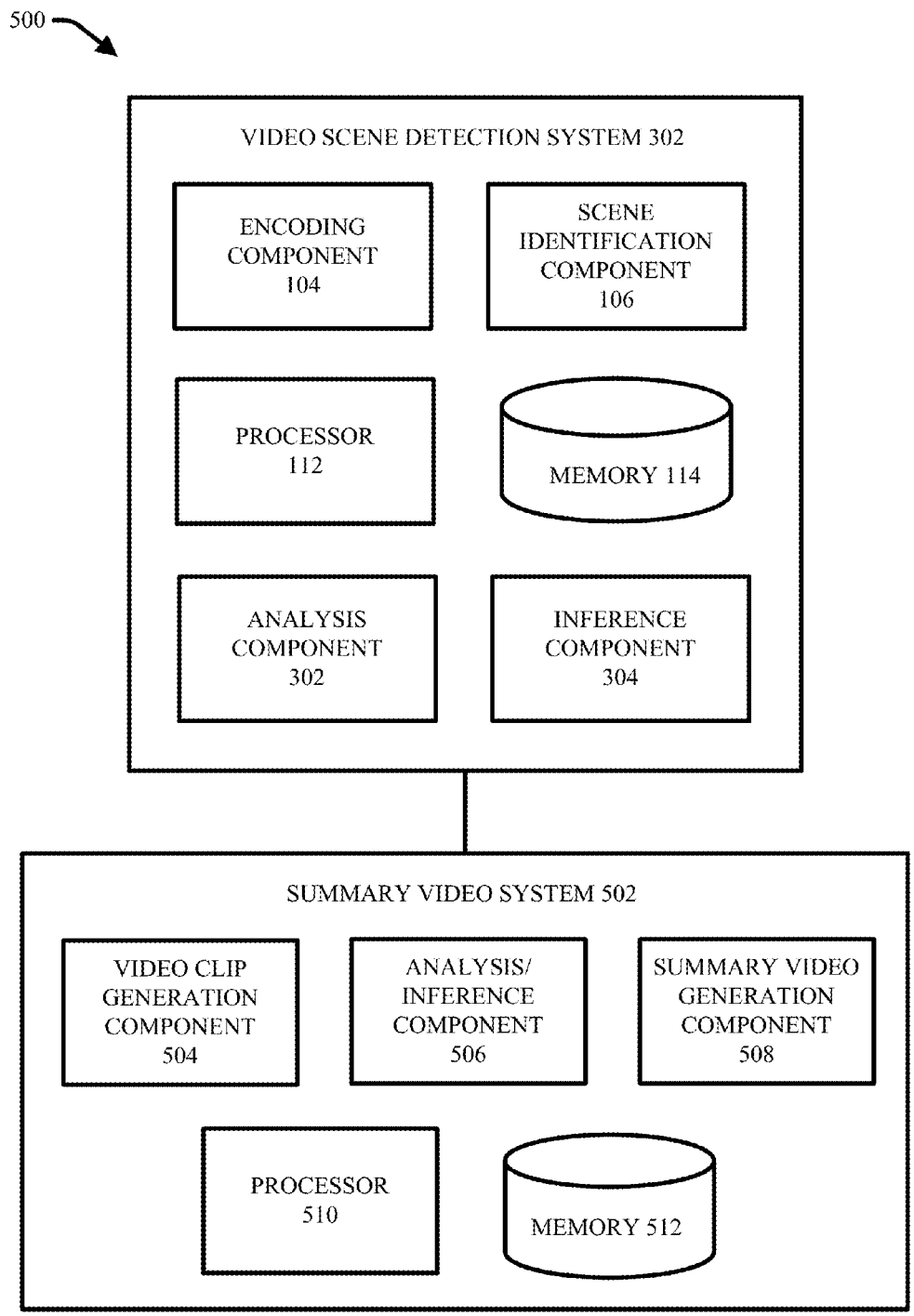
FIG. 5 presents an example system for automatically generating a summary video in accordance with various aspects and embodiments described herein.

FIG. 5 presents an example system 500 for automatically generating a summary video in accordance with various aspects and embodiments described herein. System 500 includes video scene detection system 302 and summary video system 502. Although video scene detection system 302 and summary video system 502 are shown as separate systems, it should be appreciated that video scene detection system 302 and summary video system 502 can be unified in a single device as one system. Repetitive description of like elements employed in respective embodiments of systems and methods described herein are omitted for sake of brevity.

Summary video system 502 is configured to automatically generate a summary video for a video using the different scenes identified in the video. For example, summary video system 502 can generate a shortened version of a video that includes clips from one or more of the scenes identified in the video. In an aspect, summary video system 502 can analyze the different scenes in the video and determine or infer which scenes from for which to generate the clips and duration of the respective clips based on various factors associated with the content of the video, the length of the video, and/or preferences of a user associated with summary video.

Summary video system 502 can include video clip generation component 504, analysis/inference component 506, and summary video generation component 508. In one aspect, summary video system 502 can share memory 114 and processor 112 of video scene detection system. In an aspect where summary video system 502 is separate from video scene detection system 302, summary video system 502 can include memory 512 for storing computer executable components and instructions and processor 510 to facilitate operation of the instructions (e.g., computer executable components and instructions) by summary video system 502.

Video clip generation component 504 is configured to generate video clips from one or more scenes identified in a video. For example, video clip generation component 504 can extract or copy video clips from scenes in a video. In particular, video clip generation component 504 can employ identified scene breaks in a video and generate video clips that include a subset of frames included in a scene using the identified scene breaks as starting points. For example, video clip generation component 504 can be configured to generate video clips from each identified scene in a video. Each of the video clips can have a same duration of M frames, where M is an number. According to this example, video clip generation component 504 can generate video clips from each scene in the video having a duration M where the first frame in each clip is the first frame of a scene. In an aspect, the first frame of each scene in the video will be an I-frame, as identified by video scene detection system 302. According to this aspect, the first frame of each video clip will also be an I-frame.

In an aspect, video clip generation component 504 can determine a subset of frames to extract from a particular scene in a video to generate a video clip representative of the particular scene based on analysis of the scene. According to this aspect, video clip generation component 504 can employ analysis/inference component 506 to facilitate analyzing a video scene to determine or infer which subset of frames to extract from the scene to employ in a video clip representative of the scene.

For example, rather than generating a video clip from each scene with a set duration of M, video clip generation component 504 can generate video clips from different scenes in the video having varying lengths. In addition, rather than starting each video clip for a scene using the first frame in the scene, video clip generation component 504 can select a subset of adjacent frames in the scene from a middle portion of the scene (e.g., the middle 10 frames of the scene) or an ending portion of the scene (e.g., the last 12 frames of the scene). Accordingly, video clip generation component 504 can select the best subset of frames included in a video scene from which to generate a clip for the video scene.

In an aspect, video clip generation component 506 can employ analysis/inference component 506 to analyze content associated with respective video scenes to determine or infer subsets of frames for video clips from the respective scenes. Analysis/inference component 506 can employ same or similar features and functionalities of analysis component 304 and inference component 306. In particular, analysis/inference component 506 can analyze information related to video image data content associated with respective frames in scene, audio content associated with respective frames in scene and/or metadata associated with respective frames in scene to determine or infer a good point to cut the scene to generate a video clip for the scene.

For example, analysis/inference component 506 can analyze frames of a scene to determine when an object or person has left the scene or when an object or person stops moving. According to this example analysis/inference component 506 can determine that during a particular scene, a race car comes to a stop at frame 89. The analysis/inference component 506 can then determine or infer that frame 89 is a good point to cut a video clip for the scene. In another example, analysis/inference component 506 can analyze dialogue associated with the race car scene to determine that although the race car came to a stop at frame 89, an announcer finishes a sentence regarding the race car at frame 91. Accordingly, the analysis/inference component 506 can determine or infer that frame 91 is a better point to cut a clip for the video scene.

In yet another aspect, analysis/inference component 506 can determine subsets of frames from which to generate video clips such that the length of the combined clips is a predetermined length. For example, summary video system 502 can set a predetermined length for a summary video or receive input from a user that indicates a desired length for a summary video. Accordingly, analysis/inference component 506 can analyze a video to select subsets of frames from scenes of a video such that the resulting clips accommodate a predetermined or user requested length for a summary video.

In an aspect, in addition to determining or inferring a subset of frames included in a particular scene from which to generate a video clip for the scene, video clip generation component 504 can employ analysis/inference component 506 to determine a subset of scenes in the video from which to generate video clips for. According to this aspect, video clip generation component 504 does not need to generate a video clip for each scene identified in a video. For example, where a video is relatively long in length and includes a relatively large number of scenes, analysis/inference component 506 can select a subset of the scenes from which to generate video clips for based in part on content included in the respective scenes, audio associated with the respective scenes, and/or metadata associated with the respective scenes. According to this example, video clip generation component 504 can further select which scenes to generate video clips for based in part on a predetermined or user requested length for a summary video.

In another aspect, analysis/inference component 506 can analyze a video to select subsets of frames from a scene to generate a video clip for and/or to select a subset of scenes for which to generate video clips for based in part on user preferences or user demographics. For example, in addition to indicating a desired length for a summary video, a user can indicate either definitively or indirectly, other preferences for a summary video. For example, a user can indicate that he or she wants a summary video that does not include violent or vulgar content. In another example, a user could indicate the he or she wants a summary video that includes clips from all scenes in which a particular actor appears. In yet another example, a user can request that a summary video feature scenes that include a particular car driven in the video. Still in yet another aspect, where a user is young in age, analysis/inference component 506 can infer that the content of the summary video should be tailored to a younger user as opposed to an adult user. In view of the above examples, analysis/inference component 506 can analyze video image data content, audio content, and/or metadata associated with respective frames in a video to facilitate determining which subsets of frames to extract from individual scenes to generate video clips for the respective scenes and/or which scenes from the video for which to generate video clips for, based on the declared or inferred preferences of the user.

Summary video generation component 508 is configured to generate a summary video using video clips identified and extracted by video clip generation component 504. In particular, video summary generation component 508 is configured to assemble extracted video clips generated by video clip generation component 504 to create a shortened version of the video.

Figure 6:
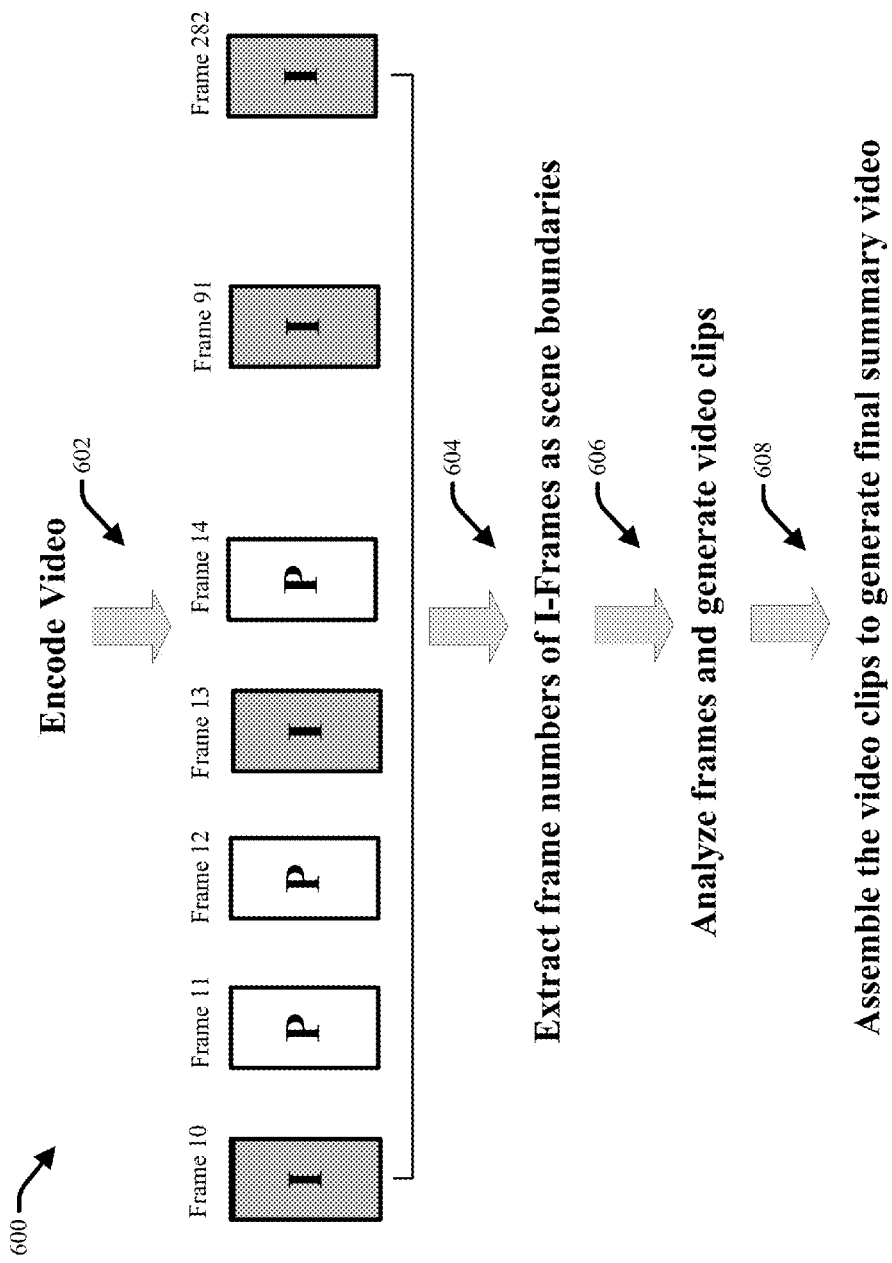
FIG. 6 presents a high level flow diagram of an example mechanism for automatically generating a summary video for a video in accordance with aspects and embodiments described herein.

FIG. 6 presents a high level flow diagram 600 of an example mechanism for automatically generating a summary video for a video, in accordance with aspects and embodiments described herein. Repetitive description of like elements employed in respective embodiments of systems and methods described herein are omitted for sake of brevity.

At 602, a video is encoded into I-frames and P-frames. In an aspect, the video can be encoded by encoding component 104 of video scene detection system 102 or 302. In another aspect, the video can be received by video scene detection system 102 or 302 already encoded into I-frames and P-frames. At 604, video scene detection system 102 or 302 can extract frame numbers of the I-frames as scene boundaries (e.g. using scene identification component 106). At 606, summary video generation system 502 can analyze the video frames in view of locations of the I-frames and generate video clips (e.g., using video clip generation component 504). Then at 608, video summary generation system 502 can assemble the video clips to generate a final summary video (e.g., using summary video generation component 508).

Figure 7:
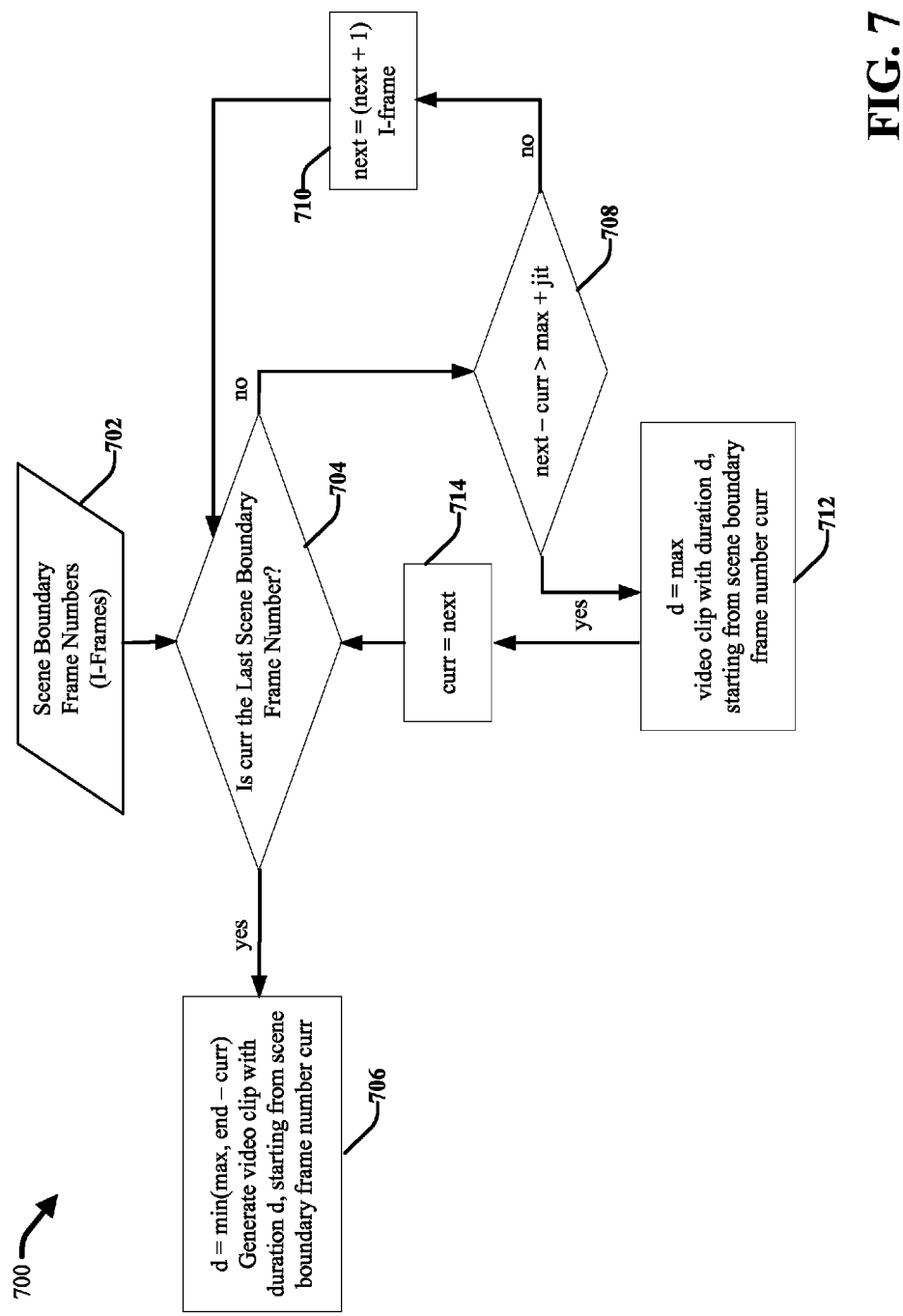
FIG. 7 presents a high level flow diagram of an example process for automatically generating video clips for respective scenes of a video in accordance with aspects and embodiments described herein.

FIG. 7 presents a high level flow diagram of an example process 700 for automatically generating video clips for respective scenes of a video, in accordance with aspects and embodiments described herein. Repetitive description of like elements employed in respective embodiments of systems and methods described herein are omitted for sake of brevity.

In an aspect, process 700 can be employed by video clip generation component 504 to automatically generate video clips using I-frames identified in the video by video scene detection system 302. In accordance with process 700, I-frames are referred to as scene boundary frames. At 702, the scene boundary frame numbers are identified (e.g., by scene identification component 106). As the scene boundary frames are identified and/or after the scene boundary frames are identified, video clips are generated (e.g., using video clip generation component 504) by moving sequentially through the video frames, beginning with the first frame of the video and ending with the last frame of the video, and cutting the video into clips in association with each occurrence of a scene boundary frame number (e.g., an I-frame).

In particular, each time video clip generation component 504 comes across a scene boundary frame number, at decision block 704 the video clip generation component 504 determines whether the current scene boundary frame number is the last scene boundary frame number (e.g., the last I-frame of the video). If the current scene boundary frame number, (curr), is the last scene boundary frame number, (end), then at 706, the video clip generation component 504 generates a video clip using the last scene boundary frame number and frames following the last scene boundary frame number. The number of frames or duration of the clip (d) will be the lesser of a predetermined maximum scene duration (e.g., with respect to number of frames), (max), or the remaining frames left in the video (e.g., last video frame number (end)−(curr)).

Returning back to decision block 704, if the current scene boundary frame number, (curr), is not the last scene boundary frame number, (end), then video clip generation component moves forward to decision block 708. At decision block 708, video clip generation component 504 determines whether the next scene boundary frame number, (next), minus the current scene boundary frame number (curr) is greater than the maximum scene duration (max) plus a jitter duration (jit), (e.g., next−curr>max+jit). If (next)−(curr) is greater than (max)+ (jit), then at 712, the video clip generation component 504 generates a video clip originating from and including (curr) with a duration, d (where d refers to clip duration in number of frames per clip), equal to the maximum duration (max) (e.g., d=max). The video clip generation component 504 then continues onto the next current scene boundary frame number at 714. In particular, the video clip generation component 504 goes back to decision block 704 and the current scene boundary frame number to be analyzed is the next scene boundary frame number.

At decision block 708, if video clip generation component 504 determines that (next)−(curr) is less than (max)+(jit), then at 710, the video clip generation component 504 goes back to decision block 704 and repeats process 700 with respect to the same current scene boundary frame number (curr) and a new (next) subsequent I-frame. In particular, video clip generation component 504 replaces (next) with (next +1) at 710. Therefore, when continuing with process 500 and following the "no" path from decision block 704 to decision block 708, the scene boundary frame considered as (next) at decision block 708 is actually (next +1) while (curr) stays the same. In other words, if the outcome of decision block 708 is "no," video clip generation component 504 skips over the I-frame analyzed as (next) at decision block 708 and repeats process 700 replacing (next) with (next +1). In this scenario where the outcome of decision block 708 is "no," the (next) scene boundary frame number (I-frame) analyzed at decision block 708 is too close to the current scene boundary frame number (curr) to be considered a scene boundary. For example, the (next) scene boundary frame number (I-frame) analyzed at decision block 708 that resulted in a "no" outcome may have been encoded as a result of jitter.

Figure 8:
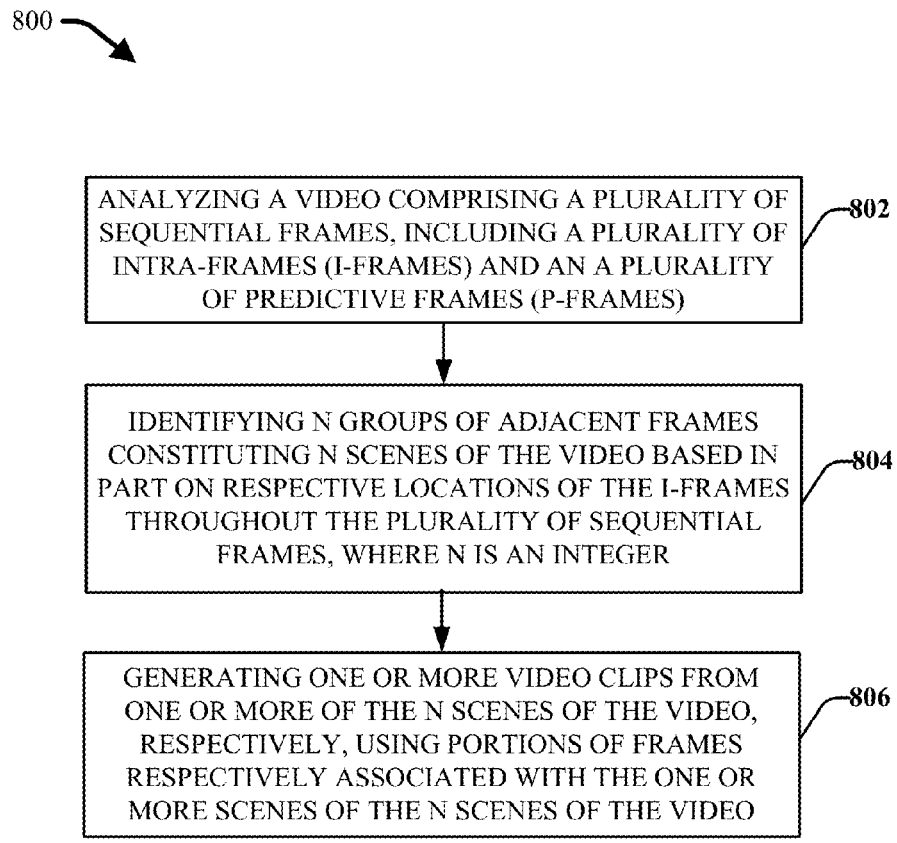
FIG. 8 is flow diagram of an example method automatically identifying scenes in a video based on parameters employed to encode the video in accordance with various aspects and embodiments described herein.
Figure 9:
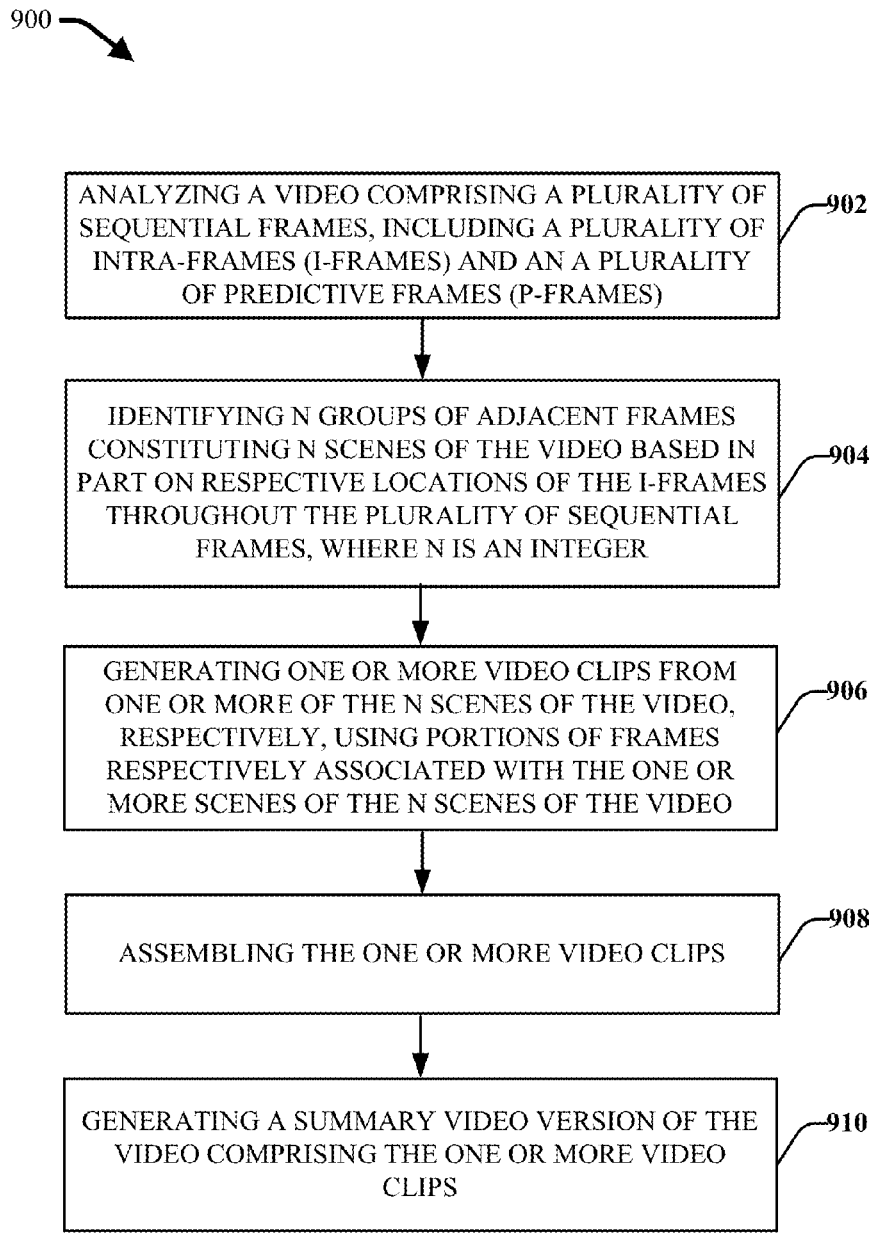
FIG. 9 is flow diagram of an example method automatically generating a summary video for a video in accordance with various aspects and embodiments described herein.
Figure 10:
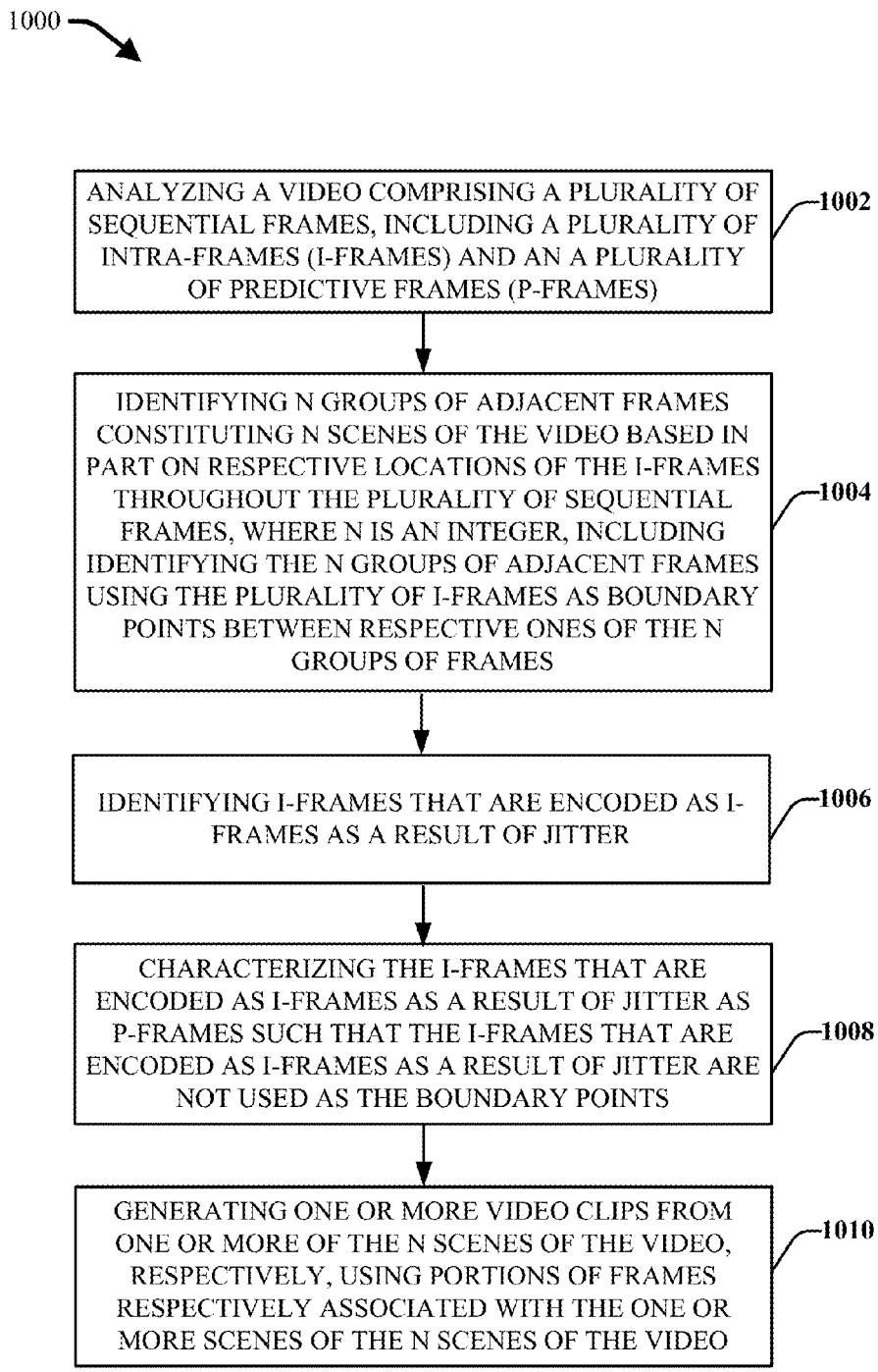
FIG. 10 is flow diagram of another example method automatically identifying scenes in a video based on parameters employed to encode the video in accordance with various aspects and embodiments described herein.

In view of the example systems and/or devices described herein, example methods that can be implemented in accordance with the disclosed subject matter can be further appreciated with reference to flowcharts in FIGS. 8-10. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 8 illustrates a flow chart of an example method 800 for automatically identifying scenes in a video based on parameters employed to encode the video, in accordance with various aspects and embodiments described herein. At 802, a video that includes a plurality of sequential frames, including a plurality of intra-frames (I-frames) and a plurality of predictive frames (P-frames) is analyzed (e.g., using scene identification component 106). At 804, N groups of adjacent frames constituting N scenes of the video are identified based in part on respective locations of the I-frames throughout the plurality of sequential frames, where N is an integer (e.g., using scene identification component 106). At 806, one or more video clips from one or more of the N scenes of the video, respectively, are generated using portions of frames respectively associated with the one or more scenes of the N scenes of the video (e.g., using video clip generation component 504).

FIG. 9 illustrates a flow chart of an example method 900 for automatically generating a summary video for a video in accordance with various aspects and embodiments described herein. At 902, a video that includes a plurality of sequential frames, including a plurality of intra-frames (I-frames) and a plurality of predictive frames (P-frames) is analyzed (e.g., using scene identification component 106). At 904, N groups of adjacent frames constituting N scenes of the video are identified based in part on respective locations of the I-frames throughout the plurality of sequential frames, where N is an integer (e.g., using scene identification component 106). At 906, one or more video clips from one or more of the N scenes of the video, respectively, are generated using portions of frames respectively associated with the one or more scenes of the N scenes of the video (e.g., using video clip generation component 504). At 908, one or more of the video clips are assembled and at 910, a summary video version of the video is generated that includes the one or more video clips (e.g., using summary video generation component 508).

FIG. 10 illustrates a flow chart of another example method 1000 for automatically identifying scenes in a video based on parameters employed to encode the video, in accordance with various aspects and embodiments described herein. At 1002, a video that includes a plurality of sequential frames, including a plurality of intra-frames (I-frames) and a plurality of predictive frames (P-frames) is analyzed (e.g., using scene identification component 106). At 1004, N groups of adjacent frames constituting N scenes of the video are identified based in part on respective locations of the I-frames throughout the plurality of sequential frames, where N is an integer, including identifying the N groups of adjacent frames using the plurality of I-frames as boundary points between respective ones of the N groups of frames (e.g., using scene identification component 106). At 1006, I-frames that are encoded as I-frames as a result of jitter are identified. At 1008, the I-frames that are encoded as I-frames as a result of jitter are characterized as P-frames such that they are not used as the boundary points (e.g., using scene identification component 106). Then at 1010, one or more video clips from one or more of the N scenes of the video, respectively, are generated using portions of frames respectively associated with the one or more scenes of the N scenes of the video (e.g., using video clip generation component 504).

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 11:
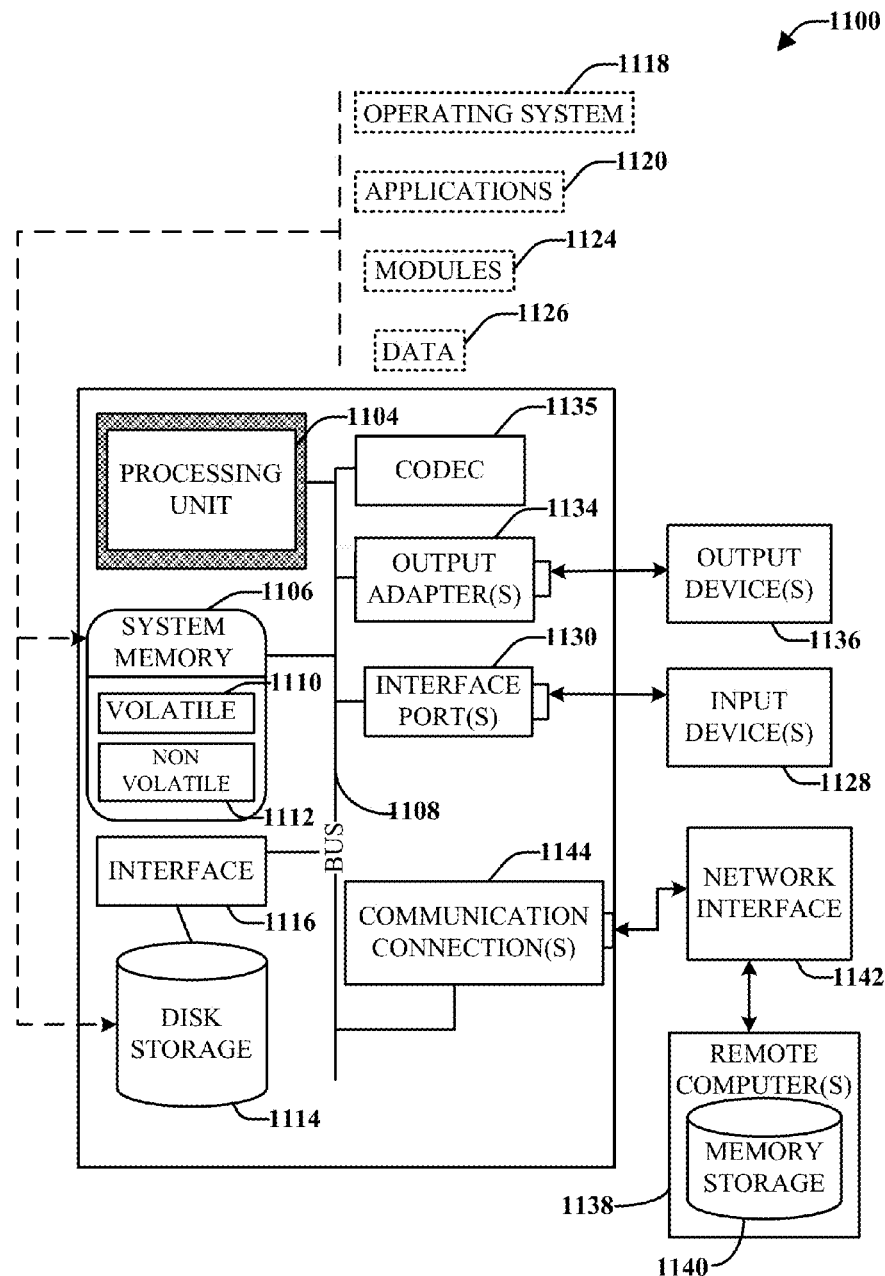
FIG. 11 is a schematic block diagram illustrating a suitable operating environment in accordance with various aspects and embodiments.

With reference to FIG. 11, a suitable environment 1100 for implementing various aspects of the claimed subject matter includes a computer 1102. The computer 1102 includes a processing unit 1104, a system memory 1106, a codec 1105, and a system bus 1108. The system bus 1108 couples system components including, but not limited to, the system memory 1106 to the processing unit 1104. The processing unit 1104 can be any of various available processors. Dual microprocessors and other multiprocessor architectures also can be employed as the processing unit 1104.

The system bus 1108 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 11114), and Small Computer Systems Interface (SCSI).

The system memory 1106 includes volatile memory 1110 and non-volatile memory 1112. The basic input/output system (BIOS), containing the basic routines to transfer information between elements within the computer 1102, such as during start-up, is stored in non-volatile memory 1112. In addition, according to present innovations, codec 1105 may include at least one of an encoder or decoder, wherein the at least one of an encoder or decoder may consist of hardware, a combination of hardware and software, or software. Although, codec 1105 is depicted as a separate component, codec 1105 may be contained within non-volatile memory 1112. By way of illustration, and not limitation, non-volatile memory 1112 can include read only memory (ROM), programmable ROM (PROM), electrically programmable ROM (EPROM), electrically erasable programmable ROM (EEPROM), or flash memory. Volatile memory 1110 includes random access memory (RAM), which acts as external cache memory. According to present aspects, the volatile memory may store the write operation retry logic (not shown in FIG. 11) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1102 may also include removable/non-removable, volatile/non-volatile computer storage medium. FIG. 11 illustrates, for example, disk storage 1114. Disk storage 1114 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1114 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1114 to the system bus 1108, a removable or non-removable interface is typically used, such as interface 1116.

It is to be appreciated that FIG. 11 describes software that acts as an intermediary between users and the basic computer resources described in the suitable operating environment 1100. Such software includes an operating system 1118. Operating system 1118, which can be stored on disk storage 1114, acts to control and allocate resources of the computer system 1102. Applications 1120 take advantage of the management of resources by operating system 1118 through program modules 1124, and program data 1126, such as the boot/shutdown transaction table and the like, stored either in system memory 1106 or on disk storage 1114. It is to be appreciated that the claimed subject matter can be implemented with various operating systems or combinations of operating systems.

A user enters commands or information into the computer 1102 through input device(s) 1128. Input devices 1128 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1104 through the system bus 1108 via interface port(s) 1130. Interface port(s) 1130 include, for example, a serial port, a parallel port, a game port, and a universal serial bus (USB). Output device(s) 1136 use some of the same type of ports as input device(s). Thus, for example, a USB port may be used to provide input to computer 1102, and to output information from computer 1102 to an output device 1136. Output adapter 1134 is provided to illustrate that there are some output devices 1136 like monitors, speakers, and printers, among other output devices 1136, which require special adapters. The output adapters 1134 include, by way of illustration and not limitation, video and sound cards that provide a means of connection between the output device 1136 and the system bus 1108. It should be noted that other devices and/or systems of devices provide both input and output capabilities such as remote computer(s) 1138.

Computer 1102 can operate in a networked environment using logical connections to one or more remote computers, such as remote computer(s) 1138. The remote computer(s) 1138 can be a personal computer, a server, a router, a network PC, a workstation, a microprocessor based appliance, a peer device, a smart phone, a tablet, or other network node, and typically includes many of the elements described relative to computer 1102. For purposes of brevity, only a memory storage device 1140 is illustrated with remote computer(s) 1138. Remote computer(s) 1138 is logically connected to computer 1102 through a network interface 1142 and then connected via communication connection(s) 1144. Network interface 1142 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1144 refers to the hardware/software employed to connect the network interface 1142 to the bus 1108. While communication connection 1144 is shown for illustrative clarity inside computer 1102, it can also be external to computer 1102. The hardware/software necessary for connection to the network interface 1142 includes, for exemplary purposes only, internal and external technologies such as, modems including regular telephone grade modems, cable modems and DSL modems, ISDN adapters, and wired and wireless Ethernet cards, hubs, and routers.

Figure 12:
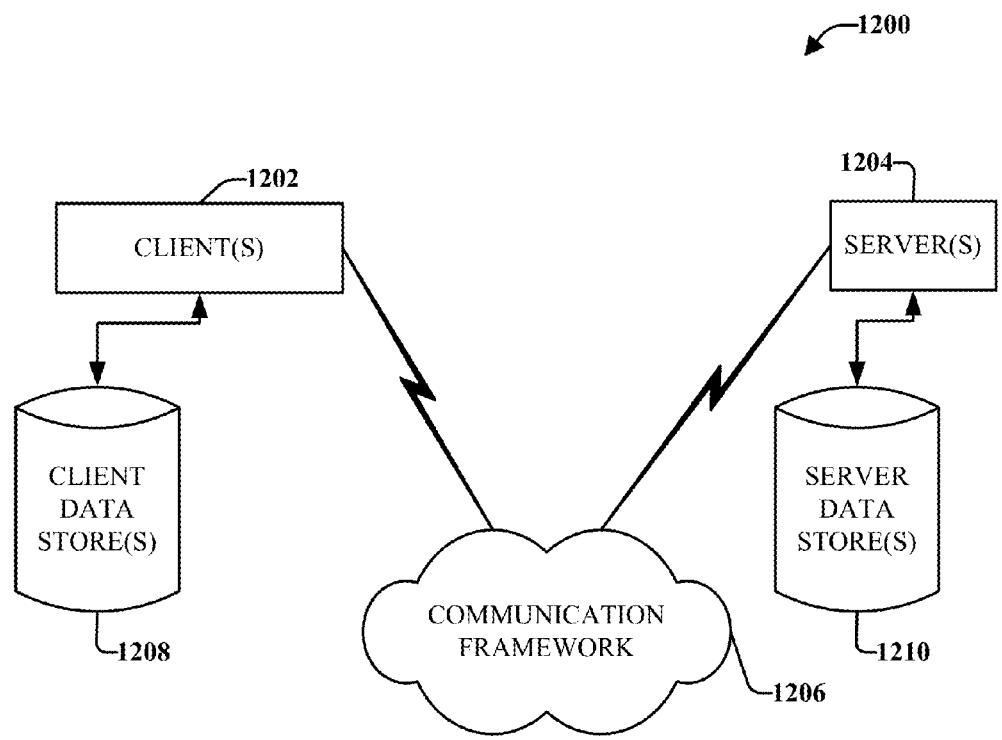
FIG. 12 is a schematic block diagram of a sample-computing environment in accordance with various aspects and embodiments.

Referring now to FIG. 12, there is illustrated a schematic block diagram of a computing environment 1200 in accordance with this disclosure. The system 1200 includes one or more client(s) 1202 (e.g., laptops, smart phones, PDAs, media players, computers, portable electronic devices, tablets, and the like). The client(s) 1202 can be hardware and/or software (e.g., threads, processes, computing devices). The system 1200 also includes one or more server(s) 1204. The server(s) 1204 can also be hardware or hardware in combination with software (e.g., threads, processes, computing devices). The servers 1204 can house threads to perform transformations by employing aspects of this disclosure, for example. One possible communication between a client 1202 and a server 1204 can be in the form of a data packet transmitted between two or more computer processes wherein the data packet may include video data. The data packet can include a metadata, e.g., associated contextual information, for example. The system 1200 includes a communication framework 1206 (e.g., a global communication network such as the Internet, or mobile network(s)) that can be employed to facilitate communications between the client(s) 1202 and the server(s) 1204.

Communications can be facilitated via a wired (including optical fiber) and/or wireless technology. The client(s) 1202 include or are operatively connected to one or more client data store(s) 1208 that can be employed to store information local to the client(s) 1202 (e.g., associated contextual information). Similarly, the server(s) 1204 are operatively include or are operatively connected to one or more server data store(s) 1210 that can be employed to store information local to the servers 1204.

In one embodiment, a client 1202 can transfer an encoded file, in accordance with the disclosed subject matter, to server 1204. Server 1204 can store the file, decode the file, or transmit the file to another client 1202. It is to be appreciated, that a client 1202 can also transfer uncompressed file to a server 1204 and server 1204 can compress the file in accordance with the disclosed subject matter. Likewise, server 1204 can encode video information and transmit the information via communication framework 1206 to one or more clients 1202.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
   a processor; and
   a memory communicatively coupled to the processor, the memory having stored therein computer executable components, comprising:
   a scene identification component configured to:
   analyze a video comprising a plurality of sequential frames, including a plurality of intra-frames (I-frames) and a plurality of predictive frames (P-frames),
   identify I-frames that are encoded as I-frames as a result of jitter based on identification of two sequential I-frames separated by less than a minimum number of P-frames,
   treat the I-frames that are encoded as I-frames as the result of jitter as P-frames such that the I-frames that are encoded as I-frames as the result of jitter are not used as boundary points between respective ones of N groups of adjacent frames, identify the N groups of adjacent frames constituting N scenes of the video based in part on respective locations of the I-frames throughout the plurality of sequential frames, where N is an integer, and using the plurality of I-frames that are not treated as P-frames as the boundary points between the respective ones of N groups of adjacent frames; and a video clip generation component configured to generate one or more video clips from one or more of the N scenes of the video, respectively, using portions of frames respectively associated with the one or more scenes of the N scenes of the video.

2. The system of claim 1, further comprising a summary video generation component configured to assemble the one or more video clips and generate a summary video version of the video comprising the one or more video clips.

3. The system of claim 1, further comprising an encoding component configured to encode the plurality of sequential frames of the video into the plurality of I-frames and the plurality of P-frames based on spatial image compression or temporal motion compensation.

4. The system of claim 1, wherein the video clip generation component is configured to generate the one or more video clips using M sequential frames from each of the one or more of the N scenes of the video using I-frames as initial frames of the M sequential frames, where M is an integer.

5. The system of claim 4, further comprising an analysis component configured to determine M based in part a number of the plurality of sequential frames included in the video.

6. The system of claim 1, further comprising an analysis component configured to determine the portions of frames respectively associated with the one or more scenes of the N scenes of the video to use to generate the one or more video clips based in part on content included in the portions of the frames.

7. The system of claim 1, further comprising an analysis component configured to determine the portions of frames respectively associated with the one or more scenes of the N scenes of the video to use to generate the one or more video clips based in part on audio included in the portions of the frames.

8. The system of claim 1, further comprising an analysis component configured to determine or infer the one or more of the N scenes of the video to generate the one or more video clips for based in part on content included in the one or more of the N scenes of the video.

9. The system of claim 1, further comprising an analysis component configured to determine or infer the one or more of the N scenes of the video to generate the one or more video clips for based in part on audio associated with the one or more of the N scenes of the video.

10. A method comprising:
analyzing, by a system including a processor, a video comprising a plurality of sequential frames, including a plurality of intra-frames (I-frames) and a plurality of predictive frames (P-frames);
identifying, by the system, I-frames that are encoded as I-frames as a result of jitter;
characterizing, by the system, the I-frames that are encoded as I-frames as the result of jitter as P-frames such that the I-frames that are encoded as I-frames as the result of jitter are not used as boundary points between respective ones of N groups of frames;
identifying, by the system, the N groups of adjacent frames constituting N scenes of the video based in part on respective locations of the I-frames throughout the plurality of sequential frames, where N is an integer, and using the plurality of I-frames that are not characterized as P-frames as the boundary points between the respective ones of N groups of adjacent frames; and generating, by the system, one or more video clips from one or more of the N scenes of the video, respectively, using portions of frames respectively associated with the one or more scenes of the N scenes of the video.

11. The method of claim 10, further comprising:
assembling, by the system, the one or more video clips; and
generating, by the system, a summary video version of the video comprising the one or more video clips.

12. The method of claim 10, wherein the generating comprises generating the one or more video clips using M sequential frames from each of the one or more of the N scenes of the video using I-frames as initial frames of the M sequential frames, where M is an integer.

13. The method of claim 12, further comprising determining, by the system, M based in part a number of the plurality of sequential frames included in the video.

14. The method of claim 10, further comprising determining, by the system, the portions of frames respectively associated with the one or more scenes of the N scenes of the video to use to generate the one or more video clips based in part on content included in the portions of the frames.

15. A non-transitory computer-readable medium having instructions stored thereon computer-readable instructions that, in response to execution, cause a system including a processor to perform operations, comprising:
analyzing a video comprising a plurality of sequential frames, including a plurality of intra-frames (I-frames) and a plurality of predictive frames (P-frames);
identifying I-frames that are encoded as I-frames as a result of jitter;
treating the I-frames that are encoded as I-frames as the result of jitter as P-frames such that the I-frames that are encoded as I-frames as the result of jitter are not used as boundary points between respective ones of N groups of frames;
identifying N groups of adjacent frames based in part on respective locations of the I-frames throughout the sequential frames of the video, where N is an integer, and using the plurality of I-frames that are not treated as P-frames as the boundary points between the respective ones of N groups of adjacent frames; and
generating one or more video clips from one or more of the N scenes of the video, respectively, using portions of frames respectively associated with the one or more scenes of the N scenes of the video.

16. The non-transitory computer-readable medium of claim 15, the operations further comprising:
assembling the one or more video clips; and
generating a summary video version of the video comprising the one or more video clips.

17. The non-transitory computer-readable medium of claim 15, wherein the generating comprises generating the one or more video clips using M sequential frames from each of the one or more of the N scenes of the video using I-frames as initial frames of the M sequential frames, where M is an integer.

18. The non-transitory computer-readable medium of claim 17, the operations further comprising determining M based in part a number of the plurality of sequential frames included in the video.

19. The non-transitory computer-readable medium of claim 15, the operations further comprising determining the portions of frames respectively associated with the one or more scenes of the N scenes of the video to use to generate the one or more video clips based in part on content included in the portions of the frames.

20. The non-transitory computer-readable medium of claim 15, the operations further comprising determining the portions of frames respectively associated with the one or more scenes of the N scenes of the video to use to generate the one or more video clips based in part on audio included in the portions of the frames.

* * * * *